US 8,250,526 B2

(12) United States Patent
Anderson et al.

(10) Patent No.: US 8,250,526 B2
(45) Date of Patent: Aug. 21, 2012

(54) METHOD FOR ANALYZING AN XACML POLICY

(75) Inventors: Anne H. Anderson, Acton, MA (US); Seth T. Proctor, Concord, MA (US)

(73) Assignee: Oracle America, Inc., Redwood Shores, CA (US)

( * ) Notice: Subject to any disclaimer, the term of this patent is extended or adjusted under 35 U.S.C. 154(b) by 1044 days.

(21) Appl. No.: 12/190,438

(22) Filed: Aug. 12, 2008

(65) Prior Publication Data
US 2010/0042973 A1    Feb. 18, 2010

(51) Int. Cl.
*G06F 9/44* (2006.01)
(52) U.S. Cl. ......... 717/112; 717/111; 717/115; 717/124
(58) Field of Classification Search .................. None
See application file for complete search history.

(56) References Cited

U.S. PATENT DOCUMENTS
8,056,114 B2 * 11/2011 Allen et al. ................. 726/1

OTHER PUBLICATIONS

Anderson, Anne, et al., "XACML profile for Web-services", http://www.oasis-open.org/committees/documents.php?wg_abbrev=xacml, Sep. 29, 2003, pp. 1-41.

"Sun's XACML Implementation—Programmer's Guide for Version 1.2", http://sunxacml.sourceforge.net/guide.html, pp. 1-11.
Anderson, Anne, Web Services Profile of XACML (WX-XACML) Version 1.0, Working Draft 10, Aug. 10, 2007, http://www.oasis-open.org/committees/download.php/21490/xacml-3.0-profile-webservices-spec-v1.0-wd-8-en.pdf, pp. 1-54.
"A Brief Introduction to XACML", http://www.oasis-open.org/committees/download.php/2713Brief_Introduction, Last updated Mar. 14, 2003pp. 1-3.

* cited by examiner

*Primary Examiner* — Chuck Kendall
(74) *Attorney, Agent, or Firm* — Park, Vaughan, Fleming & Dowler LLP (57) ABSTRACT

XACML (eXtensible Access Control Markup Language) documents, PolicySets and Policies can become long, complex and difficult to completely comprehend. A method is provided for facilitating analysis of such code to make it easier to answer questions such as: Given a particular set of Attribute values (and/or others unknown as of now), what is permitted or denied; are any of the rules redundant; are any of the rules inconsistent; for any pair of policies in the code, what set of Attributes will they both return Permit; how can a policy be refactored into an equivalent set of policies in which each branch of the policy tree pertains to specific values of specified Attributes? To facilitate such analysis and refactoring, every Rule in the collection of policies being analyzed is reduced to an equivalent expression in DNF (Disjunctive Normal Form). Some terms, predicates and other elements may be eliminated.

16 Claims, 5 Drawing Sheets

FIG. 1

```
<Condition FunctionId="urn:oasis:names:tc:xacml:1.0:function:and">
   <Apply FunctionId="urn:oasis:names:tc:xacml:1.0:function:string-equal">
      <Apply FunctionId="urn:oasis:names:tc:xacml:1.0:function:string-one-and-only">
         <SubjectAttributeDesignator
AttributeId="urn:oasis:names:tc:xacml:2.0:example:attribute:parent-guardian-id"
DataType="http://www.w3.org/2001/XMLSchema#string"/>
      </Apply>
      <Apply FunctionId="urn:oasis:names:tc:xacml:1.0:function:string-one-and-only">
         <AttributeSelector RequestContextPath="//xacml-context:Resource/xacml-context:ResourceContent/
md:record/md:parentGuardian/md:parentGuardianId/text()"
DataType="http://www.w3.org/2001/XMLSchema#string"/>
      </Apply>
   </Apply>
   <Apply FunctionId="urn:oasis:names:tc:xacml:2.0:function:date-less-or-equal">
      <Apply FunctionId="urn:oasis:names:tc:xacml:1.0:function:date-one-and-only">
         <EnvironmentAttributeDesignator
AttributeId= "urn:oasis:names:tc:xacml:1.0:environment:current-date"
DataType="http://www.w3.org/2001/XMLSchema#date"/>
      </Apply>
      <Apply FunctionId="urn:oasis:names:tc:xacml:1.0:function:date-add-yearMonthDuration">
         <Apply FunctionId="urn:oasis:names:tc:xacml:1.0:function:date-one-and-only">
            <AttributeSelector RequestContextPath=
"//md:record/md:patient/md:patientDoB/text()"
DataType="http://www.w3.org/2001/XMLSchema#date"/>
         </Apply>
         <AttributeValue
DataType="http://www.w3.org/TR/2002/WD-xquery-operators-20020816#yearMonthDuration">
            <xf:dt-yearMonthDuration>P16Y
            </xf:dt-yearMonthDuration>
         </AttributeValue>
      </Apply>
   </Apply>
</Condition>
```

FIG. 2A (<Apply FunctionId="urn:oasis:names:tc:xacml:1.0:function:string-equal">
    <SubjectAttributeDesignator
AttributeId="urn:oasis:names:tc:xacml:2.0:example:attribute:parent-guardian-id"
DataType="http://www.w3.org/2001/XMLSchema#string"/>
    <Apply FunctionId="urn:oasis:names:tc:xacml:1.0:function:string-one-and-only">
        <AttributeSelector RequestContextPath="//xacml-context:Resource/xacml-context:ResourceContent/md:record/md:parentGuardian/md:parentGuardianId/text()"
DataType="http://www.w3.org/2001/XMLSchema#string"/>
    </Apply>
</Apply> )

AND

(<Apply FunctionId="urn:oasis:names:tc:xacml:2.0:function:date-less-or-equal">
    <EnvironmentAttributeDesignator
AttributeId= "urn:oasis:names:tc:xacml:1.0:environment:current-date"
DataType="http://www.w3.org/2001/XMLSchema#date"/>
    <AttributeValue DataType="http://www.w3.org/2001/XMLSchema#date">
2002-09-24
    </AttributeValue>
</Apply> )

FIG. 2B

```
<Policy xmlns="urn:oasis:names:tc:xacml:1.0:policy"
        xmlns:xsi="http://www.w3.org/2001/XMLSchema-instance"
        xmlns:context="urn:oasis:names:tc:xacml:1.0:context"
        xmlns:memos="urn:example:documents"
        PolicyId="SelectorPolicy"
        RuleCombiningAlgId="urn:oasis:names:tc:xacml:1.0:rule-combining-algorithm:permit-overrides">
  <Description>
    This policy applies to anyone trying to read a memo from the memodirectory. Memos contain their target
    audience (a group), and only if the Subject is in that group are they allowed access.
  </Description>
  <PolicyDefaults>
    <XPathVersion>http://www.w3.org/TR/1999/Rec-xpath-19991116</XPathVersion>
  </PolicyDefaults>
  <Target>
    <Subjects>
      <AnySubject/>
    </Subjects>
    <Resources>
      <Resource>
        <ResourceMatch MatchId="urn:oasis:names:tc:xacml:1.0:function:regexp-string-match">
          <AttributeValue DataType="http://www.w3.org/2001/XMLSchema#string">http://server.example.com/memos/.*</AttributeValue>
          <ResourceAttributeDesignator DataType="http://www.w3.org/2001/XMLSchema#string"
                                       AttributeId="urn:oasis:names:tc:xacml:1.0:resource:resource-id"/>
        </ResourceMatch>
      </Resource>
    </Resources>
    <Actions>
      <Action>
        <ActionMatch MatchId="urn:oasis:names:tc:xacml:1.0:function:string-equal">
          <AttributeValue DataType="http://www.w3.org/2001/XMLSchema#string">read</AttributeValue>
          <ActionAttributeDesignator DataType="http://www.w3.org/2001/XMLSchema#string"
                                     AttributeId="urn:oasis:names:tc:xacml:1.0:action:action-id"/>
        </ActionMatch>
      </Action>
    </Actions>
  </Target>
  <Rule RuleId="AccessIfInGroup" Effect="Permit">
    <Condition FunctionId="urn:oasis:names:tc:xacml:1.0:function:string-is-in">
      <Apply FunctionId="urn:oasis:names:tc:xacml:1.0:function:string-one-and-only">
        <SubjectAttributeDesignator DataType="http://www.w3.org/2001/XMLSchema#string"
                                    AttributeId="group"/>
      </Apply>
      <AttributeSelector RequestContextPath="//context:ResourceContent/memos:Memo/memos:Audience/text()" DataType="http://www.w3.org/2001/XMLSchema#string"/>
    </Condition>
  </Rule>
</Policy>
```

METHOD FOR ANALYZING AN XACML POLICY

BACKGROUND

This invention relates to the field of computer systems. More particularly, methods are provided for analyzing XACML (eXtensible Access Control Markup Language) policies for the purpose of minimizing, refactoring and/or computing intersections of the policies.

XACML is a standardized access control policy and decision language based on XML (eXtensible Markup Language). It is used to describe access control requirements, shape access control requests, and generate a response to a request based on the requirements.

As indicated by its XML roots, XACML code is hierarchically structured (tree-shaped). Primary components of XACML include PolicySet elements and Policy elements. A PolicySet element is a container for storing Policy elements and/or other PolicySet elements. A Policy element expresses a single access control policy as a set of one or more Rules. Rules contain conditions that are evaluated to either True or False.

When a Subject attempts some Action with regard to a Resource, a Policy Enforcement Point (PEP) (e.g., a filesystem, a web server) forms a request comprising any number of attribute values describing the Subject, the Resource, the Action and the operating Environment. The request is submitted to a Policy Decision Point (PDP), which locates one or more policies that apply to the request and evaluates those policies in light of the attribute values to arrive at a decision to Permit or Deny access.

Because multiple different Policies and/or Rules may apply to a given access request, XACML provides Combining Algorithms that operate to combine decisions or effects of multiple Policies (via a Policy Combining Algorithm) or Rules (via a Rule Combining Algorithm) into a single decision. Thus, application of a Deny-overrides algorithm ensures that if any evaluation (of a Policy or Rule) had the effect of Deny (or, alternatively, if no decision evaluated to Permit), then the final decision is Deny. Similarly, a Permit-overrides algorithm can be used to ensure that the final decision is Permit in the appropriate circumstances.

Another component of XACML is the Target component. A Target is a set of conditions for a Subject, Resource, Action and/or Environment that must be satisfied in order for a particular PolicySet, Policy or Rule to apply to a given access control request. Thus, when a PDP receives a request, it may first identify applicable Targets based on the request's attributes. The associated PolicySet, Policy or Rule for each applicable Target can then be applied.

Rules, Policy elements and PolicySet elements can be very large, complex and difficult to comprehend. The very complexity of an XACML policy may make it difficult to analyze. As the number of rules and policies increases it can become increasingly difficult to manage the access control environment. In general, as individual rules and policies are constructed over time, often to address specific concerns and without much consideration of existing logic, eventually redundant, conflicting and superfluous rules and policies may make it difficult to understand the access control system.

More particularly, it can become very difficult to analyze an XACML policy to determine whether any of the policy's Rules are redundant. That is, is there a pair of Rules in the policy such that for every possible combination of attribute values they will return the same result? It can also be difficult to identify whether any Rules are inconsistent (e.g., one Rule indicates Permit for a given request while the other indicates Deny). Inconsistency is not always an error (a Policy element may specify that one of the Rules has priority over the other), but it may still be helpful to know of conflicting Rules. Other than applying brute force to test every possible combination of attribute values it may not be possible to identify redundant and/or conflicting Rules.

Other information can also be difficult to determine from a Policy, such as which set or sets of attribute values will return a Permit result (for a particular Subject, Resource, Action and/or Environment) and, given a particular set of attribute values, what combination of Subject, Resource, Action and/or Environment might be permitted or denied.

Also, it may be desirable to refactor a policy, that is, rearrange or reorganize individual predicates, conditions, Targets, Rules, Policies and/or PolicySets to create a policy that, while logically equivalent to the original, better satisfies some selected criteria. For example, a policy in which Target elements are configured to address a characteristic of a particular resource may be refactored and populated with Target elements configured to address a characteristic of a subject.

However, no automated mechanism exists to perform such an operation. It may also be desirable to compute the intersection of two policies, that is, determine what set(s) of attribute values will cause both policies to return Permit (or Deny). Other than trying every possible combination of attributes, there is no algorithm for making such a determination.

SUMMARY

In one embodiment of the invention, a method is provided for analyzing policies written using XACML (eXtensible Access Control Markup Language) logic to facilitate analysis of the policies and make it easier to answer questions such as: given a particular set of Attribute values (and/or others unknown as of now), what is permitted or denied; are any of the rules redundant; are any of the rules inconsistent; for any pair of policies, what set of Attributes will they both return Permit; how can a policy be refactored into an equivalent set of policies in which each branch of the policy tree pertains to specific values of specified Attributes? To facilitate such analysis and refactoring, for every Rule, a Disjunctive Normal Form (DNF) expression is derived that expresses the entire chain of logic leading to and including the Rule, through any number of PolicySets and/or Policies. The DNF expressions for two or more Rules may then be combined and reduced to a new, equivalent DNF expression, or some terms, predicates and other elements may be eliminated.

Depending on the nature of the XACML logic—such as whether any Rules have the Deny effect, what types of Combining Algorithms are included, and so on—different types of analyses may be performed. Based on the analyses, problems or potential problems may be highlighted for a programmer, administrator or other operator, or the logic may be automatically modified (e.g., to remove redundant rules or terms).

DESCRIPTION OF THE FIGURES

FIGS. 2A-B demonstrate the simplification of a set of Boolean functions within a collection of XACML code in an embodiment of the invention.

FIG. 3 is a diagram of a sample XACML subtree that may be reduced to a DNF expression in accordance with an embodiment of the present invention.

Table 1 demonstrates which of the two (or more) combined operands should be retained in accordance with embodiments of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In one embodiment of the invention, methods are provided for analyzing an XACML (eXtensible Access Control Markup Language) policy and/or refactorgin or reducing a policy to make it easier to analyze. Application of a method described herein makes it easier to, among other things, predict the effect of a policy based on a given (or unknown) set of attribute values and identify redundant and/or conflicting rules.

Different methods may be applied for different purposes, such as to identify redundant rules versus conflicting or inconsistent rules. Different methods may also be applied depending on the type or nature of a policy to be analyzed.

For example, one method may apply to a Policy that employs at least one Deny-overrides combining algorithm and wherein at least one Rule of the Policy has an effect of Deny. A different method may apply when a PolicySet subtree of an XACML document employs at least one Deny-overrides combining algorithm and at least one Rule within the subtree has an effect of Deny. Yet another method may apply when all PolicySets and Policies in an XACML document use Permit-overrides and/or Deny-overrides and all Rules have the effect of Permit.

Some methods of the invention described herein make a Policy easier to analyze by first converting it into Disjunctive Normal Form (DNF). In particular, every Rule within an XACML document may be reduced to a DNF expression that captures the Rule's Condition and all Targets to which the Rule applies. In addition, ancillary information may be maintained—such as any Obligation that may accompany the Policy or PolicySet containing the Rule.

As an illustrative example of the conversion of an XACML Rule into a logically equivalent DNF expression, a Rule containing the following Target and Condition elements may be considered:

Target:
(Subject="Anne" OR Subject="Seth") AND (Resource="bonuses")
Condition:
(date=2005 OR date=2006)

This Rule may be converted into the following DNF expression:

( (Subject = "Anne") AND (Resource = "bonuses") AND (date = 2005) )
OR ( (Subject = "Anne") AND (Resource = "bonuses") AND (date = 2006) ) OR ( (Subject = "Seth") AND (Resource = "bonuses") AND (date = 2005) ) OR ( (Subject = "Seth") AND (Resource = "bonuses") AND (date = 2006) )

This example demonstrates that the DNF expression that is produced captures all elements of the Rule in a form that may be more conducive to analysis.

Figure 1:
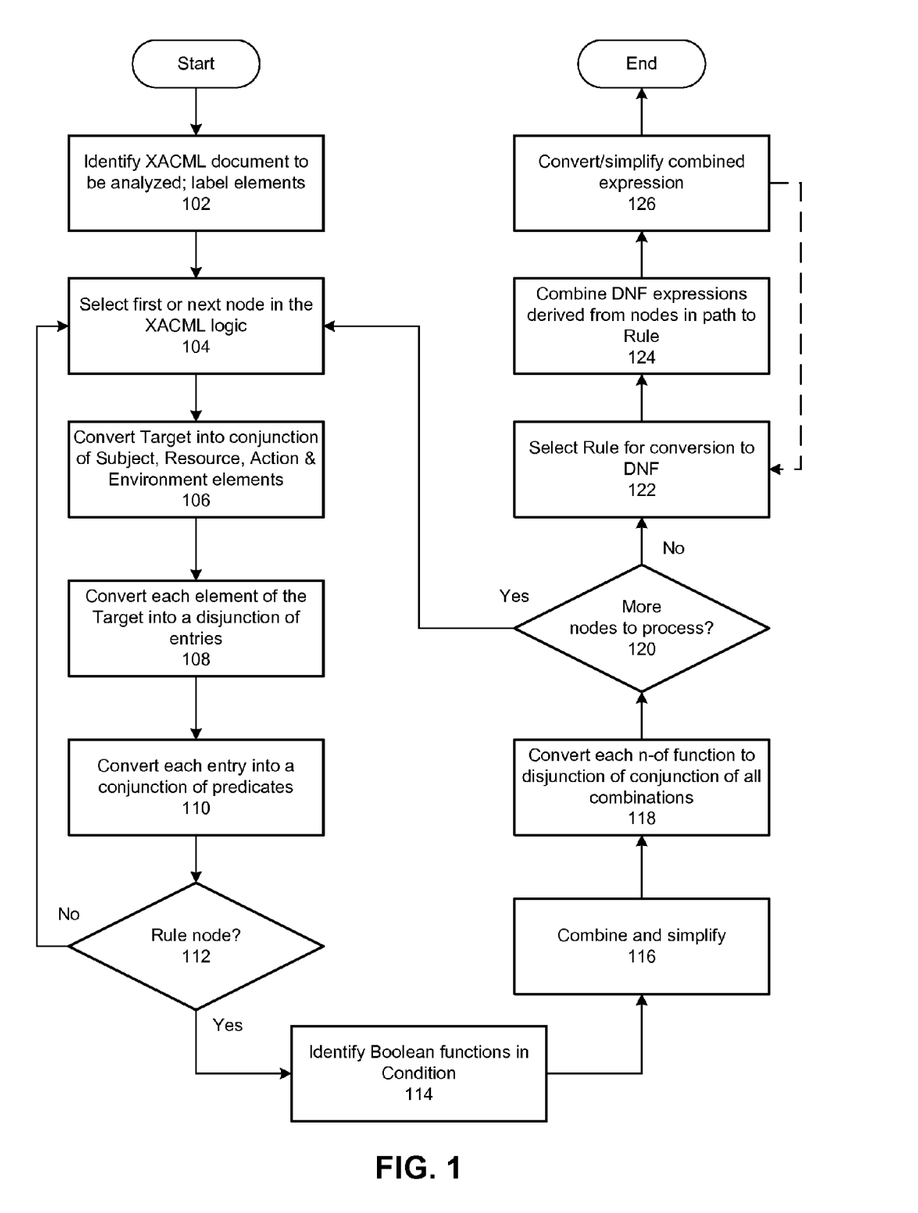
FIG. 1 is a flowchart demonstrating one method of reducing an XACML Policy or PolicySet into Disjunctive Normal Form (DNF), in accordance with an embodiment of the present invention.

FIG. 1 is a flowchart demonstrating one method of processing an XACML document to produce DNF expressions for its Rules, according to one embodiment of the invention.

More particularly, the following operations are designed to reduce a path to and including a Rule within the document to a logically equivalent DNF expression. The indicated operations may be performed any number of times to cover all Rules in the document. DNF expressions of the various Rules may then be combined to form a single DNF expression representing the entire document. Analysis of the XAMCL logic can then be performed on the DNF expression.

In a first portion of the illustrated method, nodes in the XACML logic are visited and pre-processed, to produce DNF expressions of their Target elements and, for Rule nodes, their Condition elements. After this pre-processing, a Rule may be selected and a DNF expressions of the Rule can be generated based on the DNF expressions of all Target and Condition elements in the path from the root node of the logic to the Rule.

In operation 102, the XACML document or subtree of XACML logic to be analyzed is selected. The document may be stored locally or remotely, and elements of the document (e.g., Policies, Rules) may reference other documents also stored locally or remotely.

Also in operation 102, elements of the document may be labeled or marked so that the logic can be traced to its origins during and/or after analysis. Tagging/marking of the XACML logic may continue throughout the illustrated method.

In particular, certain characteristics or metadata of a Rule's path may be tagged, marked or tracked as they are encountered. For example, for purposes of the policy analysis to be performed, it may be desirable to know whether any Rules have the effect of Deny (as opposed to only having Rules that evaluate to Permit) and to tag such Rules, what type of Combining Algorithms (i.e., Deny-overrides or Permit-overrides) are included in a Policy, whether any Rules have the effect of Indeterminate or NotApplicable, etc.

As another example, any Obligations expressed in a Policy or PolicySet may be tagged. Obligations may not affect the DNF expression generated for a Rule, but may be used in later analysis or interpretation of the Rule, Policy or PolicySet.

In operation 104, the first (or next) node in the XACML logic is selected for processing. In particular, the root node of the document is selected for processing unless it has already been processed, in which case a subsequent node in the logic is selected.

The root may be either a Policy element or a PolicySet element. As one skilled in the art will recognize, most nodes of an XACML tree have a Target element that identifies the Subject(s), Resource(s), Action(s) and Environment(s) to which the node applies, unless the node is a Rule node, in which case it may not include a Target.

In operation 106, the current node's Target is converted into a conjunction of its individual elements, in the form Subjects AND Resources AND Actions AND Environments Any empty or null element (e.g., Environments) may be omitted or evaluated to "True."

If the node does not include a Target element and is not a Rule node, the method returns to operation 104.

In operation 108, each Target element (i.e., Subjects, Resources, Actions, Environments) is converted into a disjunction of its individual entries, as follows:

( (Subject1) OR (Subject2) OR ... (SubjectN) )
( (Resource1) OR (Resource2) OR ... (ResourceN) )
( (Action1) OR (Action2) OR ... (ActionN) )
( (Environment1) OR (Environment2) OR ... (EnvironmentN) )

In operation 110, to the extent possible, each entry (e.g., SubjectX, ResourceX, ActionX, EnvironmentX) is expanded into a conjunction of element matches, as follows ( (SubjectMatch1) AND (SubjectMatch2) AND ... (SubjectMatchM) )
( (ResourceMatch1) AND (ResourceMatch2) AND ... (ResourceMatchN) )
( (ActionMatch1) AND (ActionMatch2) AND ... (ActionMatchN) )
( (EnvironmentMatch1) AND (EnvironmentMatch2) AND ... (EnvironmentMatchN) )

For example, a SubjectX entry may test for simultaneous membership in two groups or roles (e.g., "Administration" and "DeansOffice"), in which case the SubjectX entry would be converted into a conjunction of two SubjectMatches:
(SubjectMatch1="Administration" AND SubjectMatch2="DeansOffice")

In operation 112, it is determined whether the current node is a Rule node. If not, the method returns to operation 104 to select and process a next node in the XACML logic.

In operation 114, processing has reached a Rule node. To prepare for converting its Condition element into DNF, first the Boolean functions used in that element are identified, such as:

urn:oasis:names:tc:xacml:1.0:function:or
urn:oasis:names:tc:xacml:1.0:function:and
urn:oasis:names:tc:xacml:1.0:function:not
urn:oasis:names:tc:xacml:1.0:function:n-of Unlike a Target element, which is always a conjunction of a disjunction of a conjunction of predicates, a Rule's Condition may have an arbitrary number of levels of conjunction and disjunction, in any order. The logical operators, however, are explicit in the XACML expressions.

In operation 116, these functions are used to create Boolean combinations of the AttributeDesignators, AttributeSelectors and Apply parameters. In doing so, various simplifications may be made, such as treating AttributeDesignators as returning singletons instead of sets of multiple values. This allows the type-one-and-only functions to be ignored.

Figure 2B:
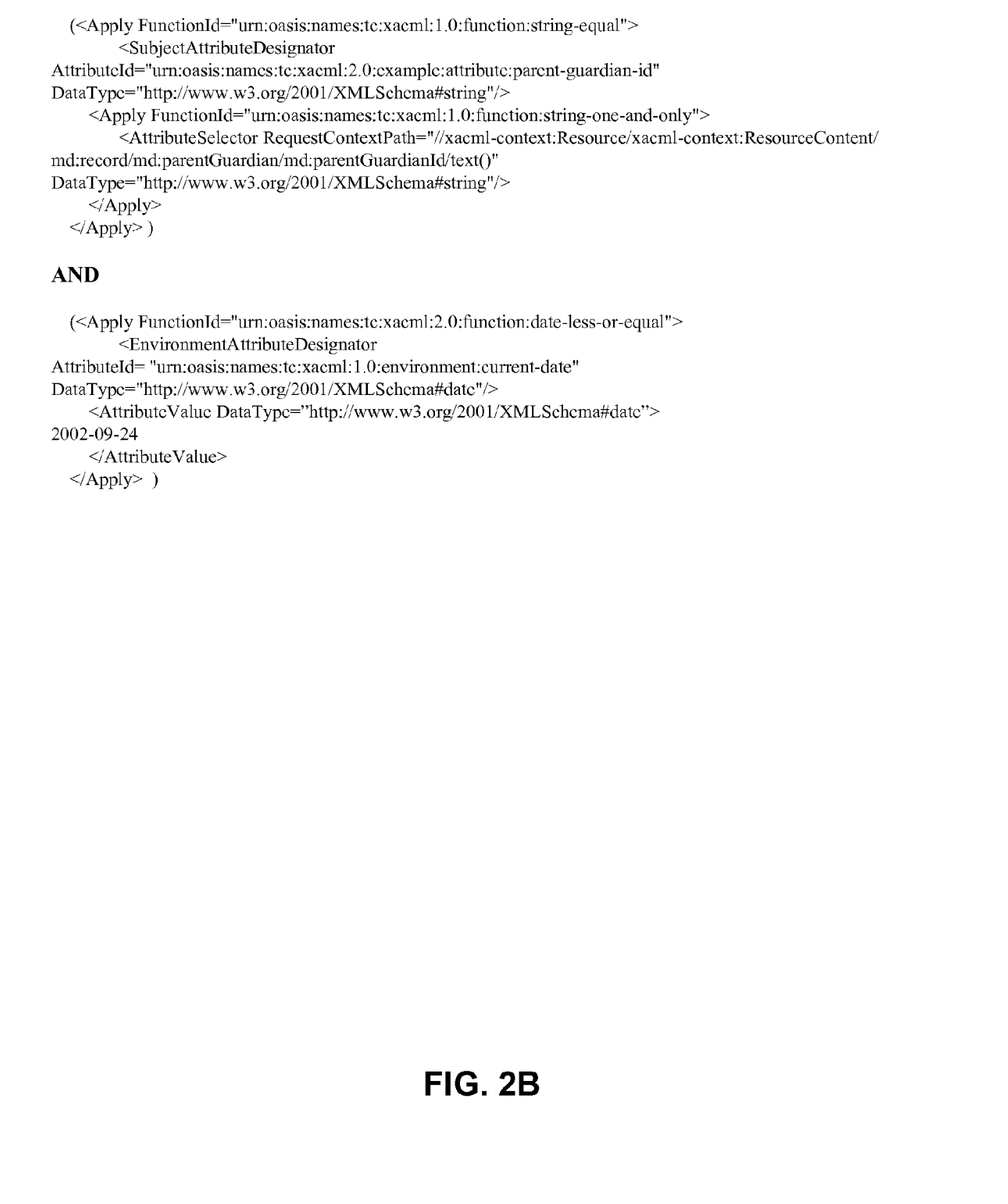

FIGS. 2A-B demonstrate how a set of Boolean functions within a collection of XACML logic may be simplified in one embodiment of the invention. FIG. 2A comprises the original XACML logic, while FIG. 2B demonstrates equivalent simplified logic connected via the AND operator.

In operation 118, each "n-of" function is converted to a disjunction of a conjunction of all combinations of n or more of the predicates. Thus, the function n-of (predicate1, predicate2, predicate3) reduces to the following, assuming n=2:

(predicate1 AND predicate2) OR
(predicate1 AND predicate3) OR
(predicate2 AND predicate3) OR
(predicate1 AND predicate2 AND predicate3)

In operation 120, if additional nodes remain to be processed, the illustrated method of the invention returns to operation 104; otherwise, the method proceeds to operation 122 to begin assembly of a Rule's equivalent DNF expression.

In operation 122, a Rule is selected and the path from the root of the logic to the selected Rule node is identified. The DNF expressions derived in operations 104-118 for each Target and Condition element in that path are retrieved. The DNF expression of a Policy Target or PolicySet Target may be referred to herein as PTx, and any number of these expressions (PT1, PT2, . . . PTn) may have been generated along the Rule's path.

Similarly, the DNF expression of the selected Rule's Target may be referred to herein as RT, and the DNF expression of the Rule's Condition may be referred to simply as C.

In operation 124, a complete expression reflecting navigation to the Rule node from the root is assembled as a conjunction of the expressions generated from each Target element and the Rule's Condition:

PT1 AND PT2 AND . . . AND PTn AND RT AND C

In operation 126, the complete expression is simplified to the extent possible. For example, some components of the combined expression may be evaluated to True, duplicative components of a conjunction may be removed, and so on. After operation 126, the method may end or return to operation 122 to select another Rule for processing.

Although the illustrated method demonstrates how DNF expressions may be generated for Rules while parsing an XACML document or subtree from its leaves (i.e., Rules) to its root, the method may be readily modified to work in the reverse direction.

Some embodiments of the invention involve the construction of a single DNF expression for any number of Policies and/or PolicySets, comprising any number of Rules. The single DNF expression is assembled by combining DNF expressions generated for each Rule with OR functions and reducing the resulting expression again to DNF:

(Rule1 DNF Expression) OR (Rule2 DNF Expression) OR . . .

For purposes of explaining the terminology used below to describe the analysis of the XACML logic via its DNF expression, consider a simple DNF expression such as (A AND B) OR (A AND C) OR (B AND C)

The word "term" or the phrase "DNF term" will be used herein to refer to the portions of this expression connected via the OR function, and the word "predicate" will be used to refer to one of the predicates connected via the AND function within a "term." A predicate consists of a simple Boolean value or a function over a set of variables (AttributeDesignators or AttributeSelectors) and values (AttributeValues) that returns a Boolean result.

Therefore, in the method of the invention depicted in FIG. 1, each DNF expression generated from a Rule-path corresponds to one "term" of a DNF expression of the XACML logic, and a DNF term includes one or more "predicates," each of which encompasses a Condition, Subject, Resource, Action or Environment portion of the Rule-path.

In one implementation, an XACML tree is traversed upward from each leaf node (i.e., Rule) to the root of the tree to construct its DNF expression. In this implementation, nodes are visited and processed in order from the selected Rule node to the root of the policy tree.

Partial forms of DNF expressions may be saved for various nodes in the XACML tree to prevent or limit redundant processing and computation. For example, as the tree is parsed, at each non-Rule Target node a partial expression representing the Target element may be saved. After one Rule (leaf) node is processed (and added to the tree's DNF expression), subsequent processing may re-use the saved partial expressions for Target elements that are traversed for subsequent Rules.

FIG. 3 depicts an illustrative XACML subtree upon which a method of the present invention may be implemented in an embodiment of the invention. The term of a DNF expression that may be assembled by applying the method of FIG. 1 to the single Rule in the XACML logic is identified below.

The method described above in conjunction with FIG. 1 specifies that the XACML subtree logic should be in the form (Condition AND Target1 AND Target2 . . . ), with each Target being converted or reduced into one or more Target predicates and with the Condition being converted into one or more Condition predicates. Because there is only a single Target and the Condition contains only one predicate, this reduces to (Condition Predicate AND Target). The Target portion can be reduced to (Subjects AND Resources AND Actions); there is no Environment node in the illustrated subtree. Because there is exactly one predicate in the Resources element and exactly one predicate in the Actions element, the Target can be further reduced to (Subject Predicate AND Resource Predicate AND Action Predicate).

The Condition, Subject, Resource and Action elements then resolve to the following DNF term, of the form ( (Condition Predicate) AND (Subject Predicate) AND (Resource Predicate) AND (Action Predicate)):

---

( ("group" string-is-in
"//context:ResourceContent/memos:Memo/memos:Audience/ AND
text( )")
    ("urn:oasis:names:tc:xacml:1.0:subject:subject-id") AND
    ("urn:oasis:names:tc:xacml:1.0:resource:resource-id"
regexp-string-match "http://server.example.com/memos/.*") AND
    ("urn:oasis:names:tc:xacml:1.0:action:action-id" string-equal
      "read") )

---

In this DNF term, the Subject predicate will always evaluate to True because there is no constraint on this term. The Resource predicate specifies that the resource to which access is requested is a file matching the pattern ". . . memos/.*" using a regular expression match. The Action predicate specifies that the Rule applies to requests for "read" access. Finally, the Condition predicate indicates that the text content of the . . . memos:Audience tag in the resource being accessed must be an element of a set containing the string "group."

If the logic in FIG. 3 included additional Rules or Policies, one or more additional DNF terms having the form ((Condition Predicates) AND (Subjects Predicates) AND (Resources Predicates) AND (Actions Predicates) AND (Environments Predicates)) would be generated and joined to the term above with OR functions.

Figure 4:
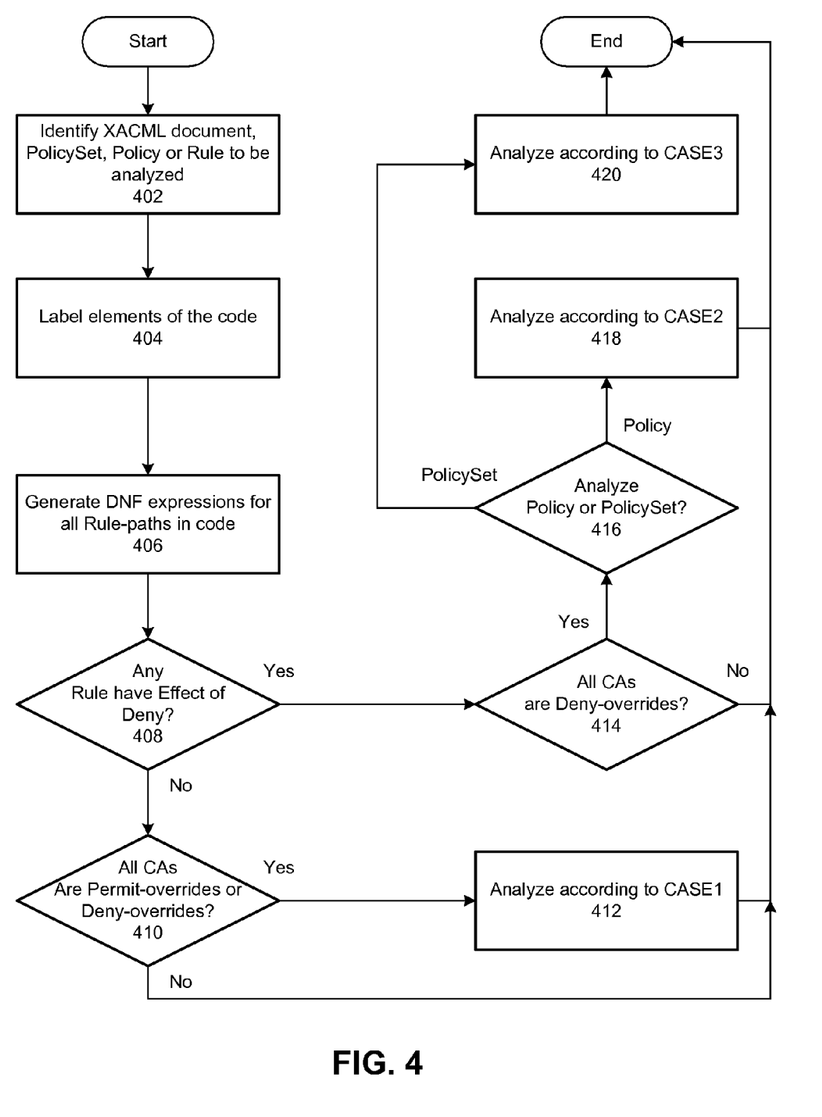
FIG. 4 is a flowchart demonstrating one method of analyzing a set of XACML code in accordance with an embodiment of the present invention.

FIG. 4 is a flowchart demonstrating a method of analyzing XACML logic according to an embodiment of the invention.

The analyzed logic may comprise an entire XACML document, or one or more PolicySet subtrees, Policy nodes/subtrees, or Rules, including their ancestor Target elements.

In operation 402, the code to be analyzed is selected. The analysis may be performed in response to a particular access request, which is accompanied by a set of Attribute values, or may be performed in advance of an access request to which the code applies.

In operation 404, elements of the code are labeled, marked or tagged. For example, Rules, Rules' Conditions and/or predicates within a Condition may be labeled to make it easier to find particular source code during or after the analysis. Different elements may be marked differently. For example, a Condition predicate or term that will encounter an error during evaluation if an Attribute value is not available may be marked with one tag. Elements of a Rule that has an Effect of Deny may be marked with a different tag. Elements of a Policy or PolicySet may receive yet a different tag, and so on.

In operation 406, a DNF expression is generated for the code being analyzed. FIG. 1 and the accompanying text describe one process of generating a DNF expression, but other methods may be used within the scope of the present invention.

In operation 408, it is determined whether any Rule in the code has an Effect of Deny. If so, the method advances to operation 414; otherwise, the method continues with operation 410.

In operation 410, it is determined whether all Policies in the code (and PolicySets, if any) employ Policy Combining Algorithms and/or Rule Combining Algorithms of the types Deny-overrides and/or Permit-overrides. If so, the method proceeds to operation 412.

If not all Policies and PolicySets employ such Combining Algorithms of the types Deny-overrides and/or Permit-overrides, the method ends. In alternative embodiments of the invention, the analysis may be limited to those Policies/PolicySets that do employ a Deny-overrides or Permit-overrides Combining Algorithm, or the method may proceed to operation 412 regardless. As another alternative, different subtrees of the code may be analyzed differently according to their type of Combining Algorithm.

In operation 412, the code is processed and analyzed as described in the CASE1 section below, then the method ends.

In operation 414, it is determined whether a combining algorithm of the Deny-overrides type is used for at least one Policy or PolicySet in the selected XACML code. If so, the method advances to operation 416; otherwise, the method may end.

In one alternative embodiment of the invention, if no Deny-overrides Combining Algorithm is employed in the identified code, the method may continue at operation 412 so that a portion of the identified code that only contains Rules with the Effect of Permit can be analyzed as described in the CASE1 section below.

In operation 416, the type of code being analyzed is examined. If the code comprises a single Policy the method continues with operation 418. Note that if the code includes multiple Policies, each of which satisfies the conditions of previous operations 408 (includes at least one Rule having and Effect of Deny) and 414 (includes a Deny-overrides Combining Algorithm), the method may initiate operation 418 for each such Policy.

If the type of code being analyzed is a PolicySet, the method advances to operation 420, which may be initiated for multiple PolicySets if appropriate.

Illustratively, if at operation 416 only a single Rule is being analyzed, it may be treated as a Policy having only a single Rule. For example, the Rule's actual Policy parent node in the code may be stripped of any other Rules and then analyzed via operation 418.

In operation 418, the code is processed and analyzed as described in the CASE2 section below, then the method ends.

In operation 420, the code is processed and analyzed as described in the CASE3 section below, then the method ends.

As specified above, in different embodiments of the invention, different levels or types of analysis may be performed depending on the nature of the XACML Policy or PolicySet being considered. Three particular cases or situations are described in the following sections, corresponding to Policies (or PolicySets) having different characteristics. References to Policies as the target of an analysis should be interpreted as applying equally to PolicySets, unless otherwise indicated or apparent.

CASE 1: Each Policy has a Permit-Overrides or Deny-Overrides Combining Algorithm & No Rule has an Effect of Deny To prepare for analysis under CASE 1, the method described above in conjunction with FIG. 1 may first be applied to reduce a collection of XACML logic to a single DNF expression. As specified above, each Rule within the logic translates to one or more terms of the DNF expression (with all terms being connected by OR functions), and each term comprises one or more predicates (connected by AND functions).

For example, if a Condition element of a given Rule contains an "OR" function, or if any of the Target elements in the Rule (or its ancestor Targets) contains more than one Subject, Resource, Action or Environment element, that Rule will reduce to multiple DNF terms.

In some embodiments of the invention, analyses described in this section may be applied to an XACML document or set of Policies (or PolicySets) in which: (a) every Policy employs a Permit-overrides or Deny-overrides Combining Algorithm, and (b) no Rule has an Effect of Deny. Under these conditions, a DNF expression of a Policy can be reduced as follows.

If any Rule evaluates to "Permit", the Policy evaluates to "Permit." Because a Rule will evaluate to "Permit" if any term of the policy's DNF expression evaluates to "Permit," all predicates of the DNF expression can be grouped into a single set.

If no Rule evaluates to "Permit," but at least one evaluates to "Indeterminate," the result of the Policy will be "Indeterminate." Otherwise, if all Rules evaluate to "NotApplicable," then the Policy evaluates to "NotApplicable."

For a Policy meeting the conditions of CASE 1, the following questions can now be answered for an access request having a set of Attributes (Attr[1], Attr[2], . . . , Attr[N]) with values (AV[1], AV[2], . . . , AV[N]), and possibly other unknown attributes.

Question 1 (for CASE 1): What action(s) might specifically be permitted or denied based on the given attributes and attribute values and/or additional Attributes not now known?

To answer this question, for every Rule in the policy, every predicate of the corresponding term of the DNF expression that can be fully evaluated using just the provided attribute values is so evaluated; in effect, the AttributeDesignator corresponding to each provided attribute value is replaced by the attribute value and the function is evaluated. The result of each such evaluation will be a predicate that is either True or False. If any such predicate is False, then the entire set of ANDed predicates (i.e., the corresponding DNF term) is removed from the policy's DNF expression. Any such predicates that evaluate to True are replaced by "True."

The result of this transformation, in particular, the resulting simplified DNF expression, provides an answer to the first question based on its new form:

(a) Empty. All sets of predicates were removed because every set contained at least one predicate that evaluated to False. Therefore, no Rule can evaluate to "Permit" for the given set of attribute values and the Policy will always return "Indeterminate."

(b) All predicates in at least one term are True. Therefore, at least one Rule in the Policy will always evaluate to "Permit" for the given set of attribute values, and the Policy likewise will always return "Permit."

(c) Every term contains at least one predicate that could not be evaluated. Therefore, the Policy can return "Permit" only if supplied with an additional set of attribute values that will make all predicates in at least one term True. And, the Policy has been reduced to a simpler set of terms and predicates that can be evaluated for an additional set of attribute values.

Question 2 (for CASE 1): Are any of the Rules redundant?

In this embodiment of the invention, redundancy is discovered not only within a single Rule (a DNF term corresponding to that Rule), but also between or among multiple Rules. Because labels were applied to elements of the XACML document before analysis began, redundant logic may be traced back to its source. After a document or Policy is analyzed under Question 2, if any redundancy is found, the offending code can be easily identified to a programmer, system administrator or other entity.

For purposes of describing this analysis, the constituent elements of an individual predicate within a DNF term are considered operands. In particular, the abstract or generic form of a predicate within a DNF term may be expressed as:

AttributeDesignator/AtributeSelector OPERATOR
AttributeValue/AttributeDesignator/AtributeSelector
where OPERATOR is an XACML function that returns a Boolean value.

Thus, a DNF expression comprises multiple DNF terms joined by OR functions; each term comprises predicates combined with AND functions; each predicate comprises a Boolean function having at least two operands.

As a first step, each term of the Policy's DNF expression is searched for two or more identical predicates, which are clearly redundant. However, to also find redundancy that is not so apparent, operands within the predicates of each DNF term are tested for intersection or equivalency. Thus, with regard to analyzing XACML logic under Question 2, redundancy encompasses not just identity (e.g., one term is exactly the same as another), but also logical equivalency—two or more terms, predicates or operands are literally different, but logically the same.

One method of determining intersection or equivalency between two or more operands is described below. Illustratively, two or more operands may be found redundant through equivalency if they reference the same subset of attribute values. If redundant operands are found through either or both examinations, all redundant operands except one are removed from the corresponding predicate.

In addition to searching for redundancy among the predicates of each Rule's DNF term, answering Question 2 requires searching for redundancy between terms. For example, if DNF terms of two or more different rules contain identical or equivalent sets of predicates (e.g., the same predicates arranged in ways that are logically equivalent), those terms are redundant.

Also, to the extent possible, each Rule's full DNF term is tested for intersection or equivalency with every other Rule's DNF term using the same (or similar) algorithm as mentioned above and described below. If an intersection between any two given Rules can be fully computed, and matches one of the expressions, then the expressions that were compared are equivalent. For example, one of the corresponding rules may be configured to return "Permit" for a subset of the requests that the other permits.

The intersection of two predicates (within the same or different terms) may be computed as follows. Each operand within one of the predicates is compared with each operand of the other predicate(s); each operand comprises one or more XACML Apply elements, which may invoke various types of functions. If there is no subset of the provided attribute values for which a combination evaluates to "True," then that combination of operands fails. If all operand combinations fail, the intersection fails and the predicates are not redundant.

For combinations that evaluate to True for some subset of the attribute values supplied with a request, TABLE 1 demonstrates which of the two (or more) combined operands should be retained. The first column (from the left-hand side) represents one of the operands being combined; the second column represents the second operand. The third column identifies any provision or condition that applies to the combination; the fourth column, where populated, indicates that the two operands are redundant and that all occurrences of the operands in the terms should be replaced by the indicated operand or value.

In TABLE 1, the first, second and fourth columns use a shorthand notation of an XACML Rule's Apply element. In particular, "E" means equal, "LT" means less-than, "GTE" means greater-than-or-equal, and so on, and "type-E", "type-GT," "type-LTE" and "set-E" represent FunctionId attribute values within the Apply element; "type-" therefore represents any of the type-specific parts of standard XACML function identifiers.

The variable sets "(a,b)" and "(a,c)" represent XACML AttributeDesignator, AttributeSelector or AttributeValue elements. Where N/A is reported in the fourth column, the predicates are compatible but not combinable, and are therefore not redundant.

TABLE 1

| Operand1 | Operand2 | Provision | Replacement Predicate |
|---|---|---|---|
| type-E(a, b) | type-E(a, c) | b == c | type-E(a, b) |
| type-E(a, b) | type-GT(a, c) | b > c | type-E(a, b) |
| type-E(a, b) | type-GTE(a, c) | b ≥ c | type-E(a, b) |
| type-E(a, b) | type-LT(a, c) | b < c | type-E(a, b) |
| type-E(a, b) | type-LTE(a, c) | b ≤ c | type-E(a, b) |
| type-GT(a, b) | type-GT(a, c) | | type-GT(a, max(b, c)) |
| type-GT(a, b) | type-GTE(a, c) | | if b ≥ c: type-GT(a, b) if b < c: type-GTE(a, c) |
| type-GTE(a, b) | type-GTE(a, c) | | type-GTE(a, max(b, c)) |
| type-LT(a, b) | type-LT(a, c) | | type-LT(a, min(b, c)) |
| type-LT(a, b) | type-LTE(a, c) | | if b > c: type-LTE(a, c) if b ≤ c: type-LT(a, b) |
| type-LTE(a, b) | type-LTE(a, c) | | type-LTE(a, min(b, c)) |
| type-GT(a, b) | type-LT(a, c) | b < c | N/A |
| type-GT(a, b) | type-LTE(a, c) | b < c | N/A |
| type-GTE(a, b) | type-LT(a, c) | b < c | N/A |
| type-GTE(a, b) | type-LTE(a, c) | b < c | N/A |
| set-E(a, b) | set-E(a, c) | b == c | set-E(a, b) |
| set-E(a, b) | subset(a, c) | b ⊆ c | set-E(a, b) |
| subset(a, b) | subset(a, c) | ∩ (b, c) ≠ 0 | subset(a, ∩(b, c)) |

The preceding intersection algorithm may also be used, as far as possible, for computing intersections between different terms to help find redundancy between their corresponding Rules, as described above.

Question 3 (for CASE 1): Are any of the Rules inconsistent?

In this portion of the analysis the Rules' DNF terms are examined to determine if, given a particular set of Attribute values, one Rule could return "Permit" while another returns "Deny." Because the conditions of CASE 1 specify that no Rule can have the effect of Deny, question 3 is irrelevant in this case.

In other cases in which a policy may have inconsistent rules, it must be considered that inconsistency is not always an error. In particular, a Policy may embrace inconsistent Rules and employ a Combining Algorithm to settle inconsistencies as they arise. However, even though a Combining Algorithm is in effect, it may still be desirable to highlight the inconsistency for a programmer, system administrator or other analyst.

Question 4 (for CASE 1): For which Attribute sets will two given Policies both return "Permit?"

To answer Question 4 for CASE 1, the intersection algorithm described above is executed to find intersections, to the extent possible, between all Rule pairings of the two Policies. Thus, the intersection will be computed between each Rule's DNF term in one Policy's DNF expression and every Rule's DNF term in the other Policy's expression. Each intersection that is not an empty set describes a set of Attributes for which the corresponding Rules will both return "Permit."

If two Rules do not intersect, they may be removed from consideration for this Question. If the intersection cannot be computed for two Rules, then it cannot be conclusively determined what Attribute sets will cause both Rules to return "Permit."

Question 5 (for CASE 1): How can a single Policy or PolicySet be refactored or restructured into an equivalent set of multiple Policies?

Question 5 may be applied when a Policy needs to be restructured, perhaps to make it more efficient. For example, an organization may have originally grouped its XACML policies based on the resource to which the policies applied. There would be a set of policies for each resource identifier or set of identifiers, and the top-level Target elements would be configured to select the set of policies to be used based on the input resource identifier.

Later, however, the organization may have realized that it would be more efficient to group the policies according to the subject(s) to which they apply. The same conditions apply for gaining access, but now the organization wants to factor those conditions based on subject rather than on resource.

This can be done by constructing the DNF expression for the entire policy. Then, those terms that are True for each possible subject identifier are selected. The test for subject identifier becomes the Target element for a new Policy, and the remaining predicates in each such term become Rules under that Policy. Then all the Policies are combined under a new PolicySet.

The result is no change in who is allowed to access which resource under which conditions, but the evaluation may be more efficient because the conditions pertaining to a given subject vary more than the conditions pertaining to a given resource.

In another embodiment of the invention, a refactoring process can be generalized as follows to focus on any number of Attributes referenced in a given Policy to be refactored. For each possible combination of the Attributes' values, a new Rule is created with a Target element corresponding to one combination of those Attribute values, plus an extra "default" Rule with no Target element. Each Rule receives a Condition element with an empty OR function. Evaluate every predicate—in every DNF term derived from the original Policy—that references the combination of Attributes.

If an evaluated predicate resolves to "True," add the remaining predicates of the same DNF term as parameters of an AND function inside the OR function of the corresponding new Rule's Condition element. For any DNF term does not reference the combination of Attributes, and for any predicate of a DNF term that cannot be completely evaluated, insert all predicates of the DNF term as parameters of an AND function inside the OR function of the new default Rule's Condition.

CASE 2: One Policy uses a Deny-Overrides Combining Algorithm & at Least One Rule has an Effect of Deny In some embodiments of the invention, analysis described in this section may be applied to a single Policy in which: (a) the Policy employs a Deny-overrides Combining Algorithm, and (b) at least one Rule has an Effect of Deny. These conditions allow the following observations and simplifications.

If any Rule that has an Effect of Deny evaluates to "Deny" for the Attribute values of an access request, the Policy also evaluates to "Deny." If all Rules in the Policy evaluate to "Indeterminate," or if any Rule that has an Effect of Deny evaluates to "Indeterminate" and no Rule evaluates to "Deny," then the Policy evaluates to "Indeterminate."

If at least one Rule evaluates to "Permit," and no Rules having an Effect of Deny evaluate to "Deny" or "Indeterminate," then the Policy evaluates to "Permit." Finally, if all Rules evaluate to "NotApplicable" then the Policy evaluates to "NotApplicable."

When a Rule or Policy evaluates to "Indeterminate," for purposes of analysis it may be assumed that the only errors that may have occurred and led to this evaluation are internal to the Policy (i.e., assume no network or communication failures). Such internal errors may include a missing Attribute referenced in a "one-and-only" function, a missing Attribute marked with a "must-be-present" flag, an Attribute value of 0 in the denominator of a divide function, and/or others. One skilled in the art of XACML programming or analysis will recognize functions that may fail due to a problem with an Attribute.

If a function's Attribute is missing, each predicate that would fail or encounter an error because of the missing Attribute is marked. For the purpose of searching for redundancy by computing an intersection or examining equivalency (e.g., between predicates or sub-predicates, between terms of a DNF expression), an Attribute marked with an indication that a missing attribute will cause an error will not match with something that does not have a constraint on the Attribute.

Within XACML code governed by a Policy Combining Algorithm of "Deny-overrides," a missing Attribute in a Rule that has an effect of "Deny" will propagate up to an evaluation of "Deny." For a Rule Combining Algorithm of "Deny-overrides," a missing Attribute in a Rule that has the effect of "Deny" will propagate up to an evaluation of "Indeterminate" if there are no explicit False results.

To assist in the analysis of a Policy that includes one or more Rules with Effects of Deny, the DNF terms derived for all Rules of the Policy are combined into a single chain as follows. Every Rule having an Effect of Permit is adopted as is, as a Permit term in the form "(Permit Rule DNF)." Every Rule having an Effect of Deny is negated to form a Deny term in the form "NOT(Deny Rule DNF)." The portions of the terms within parentheses (i.e., "Permit Rule DNF" and "Deny Rule DNF") are the original DNF expressions. The various Permit terms and Deny terms are combined with AND to form a single expression similar to (Permit Rule $DNF_i$) AND . . . NOT(Deny Rule $DNF_j$) AND . . .

The order in which Rules' DNF terms are imported into this united expression may not matter except for efficiency. For example, if it is desired to know which Rule of the Policy will first evaluate to a particular value (Deny or Permit), the order of terms within the united expression may match the order in which the Rules are encountered when parsing the Policy.

In summary, the DNF terms for all Rules within the Policy (or PolicySet) currently being analyzed are combined into a single united expression. Any errors encountered in the evaluation of this expression may result in an evaluation of "Indeterminate." Because the Policy employs a Deny-overrides Combining Algorithm, if any term of the expression evaluates to False for a given set of Attribute values, the result is a denial of access.

This manipulation of the Rule(s)'s DNF terms facilitates various analyses of XACML code matching the conditions of CASE2, such as the following.

Question 1 (for CASE 2): What action(s) might specifically be permitted or denied based on a given set of attributes and attribute values, and/or additional Attributes not now known?

For a given set of Attributes and values of those Attributes, all terms in a DNF expression that correspond to Rules that have the Effect of Deny are evaluated. Unless subsequent evaluation of the other terms of the DNF expression results in an error, access based on the given set of Attribute values is denied.

It may be noted that if no Rule having an Effect of Deny applies to a given access request, the Rule, Policy or PolicySet may be analyzed under CASE1 rather than CASE2.

CASE 3: One PolicySet uses a Deny-Overrides Combining Algorithm & has at Least Rule with an Effect of Deny In some embodiments of the invention, analysis described in this section may be applied to an XACML document or PolicySet in which: (a) the PolicySet subtree employs a Policy Combining Algorithm of Deny-overrides, (b) all Rule Combining Algorithms are Deny-overrides and (c) at least one Rule has an Effect of Deny. These conditions allow the following observations and simplifications.

Under the conditions of CASE 3, the DNF terms of the Rules within the PolicySet that have Effects of Deny cannot be merged. However, terms of all such DNF expressions are labeled and evaluated.

Question 1 (for CASE 3): What action(s) might specifically be permitted or denied based on a given set of attributes and attribute values, and/or additional Attributes not now known?

As with CASE 2, for a given set of Attributes and values of those Attributes, all terms in a DNF expression that correspond to Rules that have the Effect of Deny are evaluated. Any such terms that can be completely evaluated based on the Attribute values are removed from the DNF expression. Unless subsequent evaluation of the resulting shortened DNF expression results in an error, access for the given set of Attribute values is denied.

It may be noted that if no Rule having an Effect of Deny applies to a given access request, the Rule, Policy or PolicySet may be analyzed under CASE1 rather than CASE3.

The environment in which a present embodiment of the invention is executed may incorporate a general-purpose computer or a special purpose device such as a hand-held computer. Details of such devices (e.g., processor, memory, data storage, display) may be omitted for the sake of clarity.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description can be embodied as code and/or data, which can be stored in a computer-readable storage medium as described above. When a computer system reads and executes the code and/or data stored on the computer-readable storage medium, the computer system perform the methods and processes embodied as data structures and code and stored within the computer-readable storage medium.

Furthermore, the methods and processes described below can be included in hardware modules. For example, the hardware modules may include, but are not limited to, application-specific integrated circuit (ASIC) chips, field programmable gate arrays (FPGAs), and other programmable-logic devices now known or later developed. When the hardware modules are activated, the hardware modules perform the methods and processes included within the hardware modules.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. A method of analyzing XACML (eXtensible Access Control Markup Language) code comprising one or more XACML policies, the method comprising:
    storing the code in an electronic memory;
    for each rule in the code, constructing in disjunctive normal form an expression of a path through the code to the rule;
    tagging one or more elements of one or more of the paths;
    determining whether any rules in the code have an effect of deny; and
    for every XACML policy in the code, determining which type of combining algorithm the policy includes.

2. The method of claim 1, wherein said determining which type of combining algorithm the policy includes comprises:
    determining whether every XACML policy in the code includes a combining algorithm of the deny-overrides type.

3. The method of claim 1, further comprising:
    determining whether the code comprises a policyset element.

4. The method of claim 1, further comprising:
    identifying values for one or more attributes referenced in the code; and
    determining which actions, if any, are permitted by the code in association with the identified attribute values.

5. The method of claim 4, wherein said determining which actions are permitted comprises:
    for each disjunctive normal form expression of a rule, determining whether a condition of the rule is satisfied by the identified attribute values.

6. The method of claim 1, further comprising:
    identifying values for one or more attributes referenced in the code; and
    determining whether any rules in the code are redundant.

7. The method of claim 6, wherein said determining whether any rules are redundant comprises:
    for each pair of terms within each disjunctive normal form expression:
        comparing the terms for logical equivalence; and
    for each pair of disjunctive normal form expressions:
        comparing the expressions for logical equivalence;
    wherein two terms in a disjunctive normal form expression are equivalent if they return the same result for the identified attribute values; and
    wherein two disjunctive normal form expressions are equivalent if they return the same result for the identified attribute values.

8. The method of claim 1, further comprising:
    identifying values for one or more attributes referenced in the code; and
    attempting to determine whether any pair of the rules in the code are inconsistent.

9. The method of claim 8, wherein said determining whether any pair of the rules in the code are inconsistent comprises:
    for every rule that evaluates to deny for the identified attribute values, determining whether a different rule evaluates to permit for the identified attribute values.

10. The method of claim 8, wherein said determining whether any pair of the rules in the code are inconsistent comprises:
    for every rule that evaluates to permit for the identified attribute values, determining whether a different rule evaluates to deny for the identified attribute values.

11. The method of claim 1, further comprising:
    for each pair of XACML policies in the code, determining whether both policies will return permit for a given set of attribute values.

12. The method of claim 11, wherein said determining whether both policies will return permit for a given set of attribute values comprises:
    testing the policies for logical equivalence;
    wherein two policies are logically equivalent if they return the same result for the given set of attribute values.

13. The method of claim 1, further comprising:
    for each policy in the code, attempting to refactor the policy into sub-policies, wherein each said sub-policy comprises a single rule pertaining to one value of a specified attribute.

14. The method of claim 13, wherein said refactoring the policy into sub-policies comprises:
    for each value of the specified attribute:
        creating a sub-policy comprising a form of the rule in which the specified attribute posses said value; and
        inserting in the sub-policy a target element containing a subjectmatch element that matches said value;
    creating an additional sub-policy comprising a form of the rule in which the specified attribute is omitted;
    wherein the additional sub-policy does not contain a target element.

15. The method of claim 13, wherein said constructing in disjunctive normal form an expression of a path through the code to the rule comprises:
    for every target element in the path, generating a policy target expression expressing the target element in disjunctive normal form;
    if the rule comprises a target element, generating a rule target expression expressing the target element in disjunctive normal form;
    generating a condition expression expressing a condition element of the rule in disjunctive normal form; and combining the policy target expressions, the rule target expression and the condition expression to form said disjunctive normal form of the expression of the path through the code to the rule.

16. A computer-readable medium storing instructions that, when executed by a computer, cause the computer to perform a method of analyzing XACML (eXtensible Access Control Markup Language) logic comprising one or more XACML policies, the method comprising:

storing the code in an electronic memory;

for each rule in the code, constructing in disjunctive normal form an expression of a path through the code to the rule;

tagging one or more elements of one or more of the paths;

determining whether any rules in the code have an effect of deny; and for every XACML policy in the code, determining which type of combining algorithm the policy includes.

* * * * *